United States Patent

Vensel et al.

[11] 3,893,029
[45] July 1, 1975

[54] AUTOMOBILE ALTERNATOR TESTER

[76] Inventors: Richard R. Vensel, 45329 6th St., E.; Jerry A. Leach, 45800 N. 10th St., E., both of Lancaster, Calif. 93534

[22] Filed: Mar. 25, 1974

[21] Appl. No.: 454,125

[52] U.S. Cl. ............................ 324/158 MG; 324/15
[51] Int. Cl. ...................... G01r 31/02; G01r 19/16
[58] Field of Search .......... 324/158 MG, 15, 158 D, 324/102; 322/99

[56] References Cited
UNITED STATES PATENTS
3,409,824  11/1968  Makuh ................................. 324/15
3,629,704  12/1971  Stevens ........................ 324/158 MG Primary Examiner—Stanley T. Krawczewicz
Assistant Examiner—Ernest F. Karlsen
Attorney, Agent, or Firm—Christie, Parker & Hale

[57] ABSTRACT

A circuit for testing the operation of an alternator by comparing the DC output level and the AC output level at the battery terminal of the alternator. Only if the DC output is above a predetermined level and the AC output is below a predetermined level does the tester provide a "satisfactory" indication.

6 Claims, 2 Drawing Figures

AUTOMOBILE ALTERNATOR TESTER

Field of the Invention

This invention relates to a circuit for testing the operation of an automobile alternator and, more particularly, is concerned with a circuit for measuring both the DC and AC components of the alternator output.

BACKGROUND OF THE INVENTION

The use of a three-phase alternator with full wave rectification for an electrical power source in an automobile is well known. Conventional dynamic testing techniques for alternators involves testing the voltage and/or current output of the alternator under full load conditions. Full load is imposed because an alternator with only one of the six rectifiers in the full wave rectifier circuit either open or shorted may not show a significant drop in DC output voltage under low load conditions. Nevertheless the alternator will not function to maintain the charge on the battery under more severe load conditions. Hence conventional tests have always involved operating the alternator to determine whether the alternator is capable of performing up to its maximum output capacity under a rated load. This of course requires that the alternator be driven directly off the engine or by some other heavy duty drive source capable of maintaining high rotational speed under full load conditions. Generally such tests are carried out with the alternator driven by the engine and with the battery and regulator connected.

SUMMARY OF THE INVENTION

The present invention is directed to a tester capable of testing the performance of an automobile alternator with the alternator operated under no-load conditions. The alternator can be either driven from the engine with the battery and regulator disconnected during the test, or the alternator can be bench-tested by driving the alternator rotor by an electric motor. Because the test is made under no-load conditions, a very small electric motor can be used to spin the alternator during the test. The tester does not require any analysis of oscilloscope wave forms, the reading of calibrated meters, or assessments of speed and load conditions to perform the test. Thus the tester can be used by persons without any special training. For example, the tester could be available to the customer at a retail outlet for pretesting the condition of a purchased alternator or to test the old alternator before purchasing a new alternator.

In brief, the present invention provides a tester in which the alternator is driven at normal speed. A test circuit connected to the battery output terminal of the alternator senses both the DC and the AC components of the output voltage. Only if the DC component is above a predetermined level and the measured AC component is below a predetermined level does the tester signal, by turning on a green light, that the alternator is satisfactory.

BRIEF DESCRIPTION OF THE DRAWINGS

For a better understanding of the invention reference should be made to the accompanying drawings, wherein.

DETAILED DESCRIPTION

Figure 1:
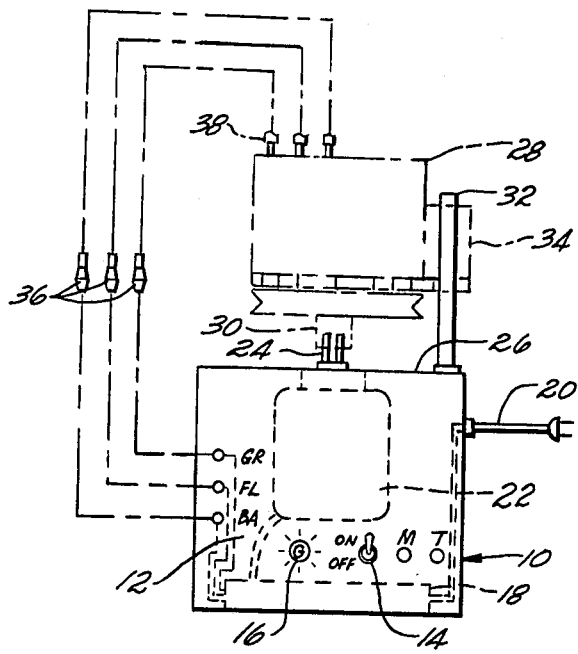
FIG. 1 is a perspective view of the tester unit.

Referring to FIG. 1, the test unit is indicated generally at 10. The test unit is housed in a metal box having a front face 12 which includes an On/Off control switch 14, a push-button switch M for initiating spinning of the alternator, and a push-button switch T for initiating the test. A display light 16 turns on if the test is successful, providing a green illumination and displaying the letter G, indicating that the alternator is not defective.

Mounted within the housing of the test unit 10 is the circuit chassis 18 to which is connected an input power cord 20 for connecting the unit to a suitable 115 volt AC power source.

Mounted within the housing of the test unit 10 is a motor 22 having an output shaft 24 projecting up out of the top 26 of the housing. The motor 22 may include an output gear drive to provide a speed of approximately 1000 rpm for the output shaft 24.

The output shaft 24 is preferably of a hexagonal shape adapted to engage a hexagonal allen-head wrench type of socket commonly found in the end of the automobile alternator drive shaft. This enables an alternator under test, indicated at 28, having an output shaft 30 to be positioned on the tester so that the shaft 30 fits over the end of the output shaft 24. The alternator 28 is mounted in position by a guide post 32 extending up from the top 26 of the tester housing. The post 32 engages a bolt opening in the mounting bracket 34 on the housing of the alternator. Spacing between the shaft 24 and the mounting post 32 may be varied to accommodate different models of alternators, or additional posts positioned at different angular and radial positions relative to the drive shaft 24 may be provided on the top 26 to accommodate different size alternators. If the alternator shaft 30 does not have a hexagonal socket, then an adapter (not shown) may be provided for coupling the shaft of the alternator under test to the output shaft 24.

Three test leads, identified as GR, FI, and DA, have terminal clips 36 which are connected respectively to the conventional ground, field, and battery terminals 38 provided on the back of the alternator 28.

With the unit turned on, the alternator under test mounted in position, and the three test leads connected to the alternator terminals, the push-button M and T are simultaneously depressed. This turns on the motor 22 to spin the alternator 28 and activates the field winding of the alternator. If the test light 16 comes on and remains on while both push-buttons are depressed, the alternator is operating satisfactorily. If the test light does not come on or comes on momentarily and goes off, the alternator has failed the test and is therefore defective.

The tester can also be used to test the alternator without removing it from the engine simply by disconnecting the car battery from the back of the alternator and disconnecting the regulator. The test leads from the tester are connected to the alternator terminals in the same manner. The automobile engine is then used to drive the alternator, and the test is conducted by depressing the test button T. The test results are indicated in the same manner as described above.

Figure 2:
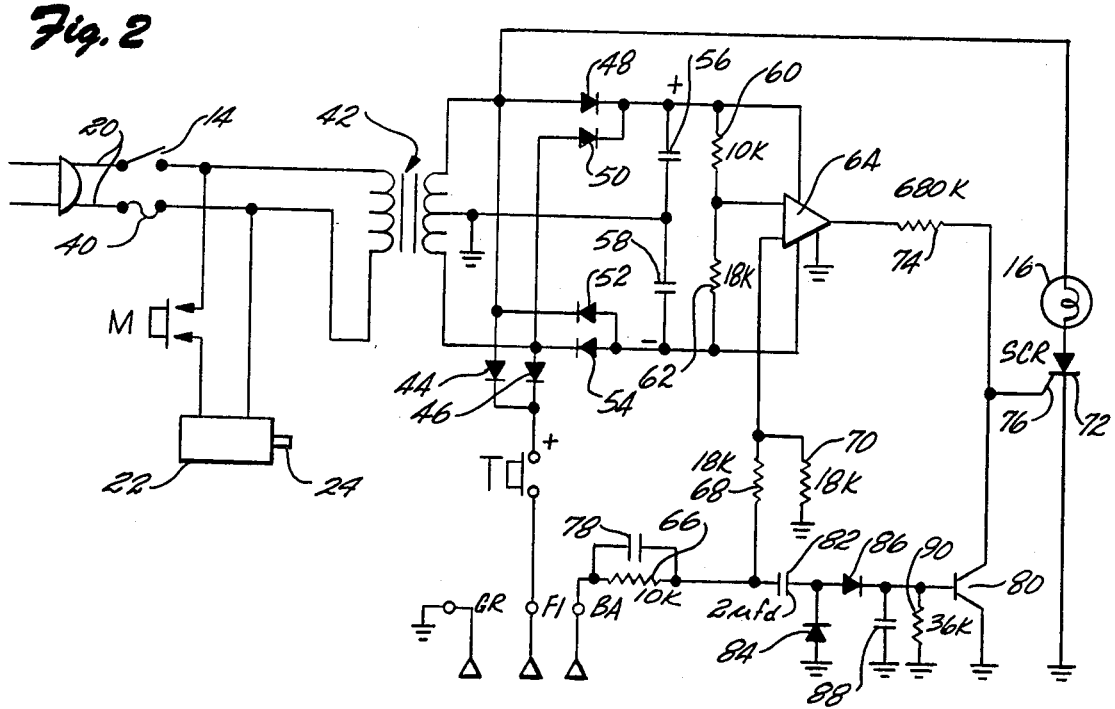
FIG. 2 is a schematic diagram of the tester circuit.

The schematic circuit diagram for the tester unit 10 is shown in FIG. 2. The lion cord 20 is connected through the On/Off switch 14 and a circuit breaker 40 to the primary of a transformer 42, as well as to the drive motor 22 through the normally open push-button switch M.

The field winding of the alternator is energized with rectified DC through a full wave rectifier, including a pair of diodes 44 and 46 connected between opposite ends of the secondary winding of the transformer 42 and the test lead FI through the normally open push-button switch T. The center top on the secondary is connected through ground to the test lead GR. Thus when the switch T is closed, a rectified DC voltage is applied between the field terminal and the ground terminal of the alternator under test.

The secondary of the transformer 42 is also connected across a bridge rectifier including four diodes 48, 50, 52 and 54. The output of the bridge rectifier is filtered by a pair of capacitors 56 and 58. The filtered output is connected across a voltage divider including a pair of resistors 60 and 62. The output of the bridge rectifier circuit is used to energize an operational amplifier 64, which preferably is a standard 741 I.C. amplifier circuit. One input to the operational amplifier 64 is derived from the voltage divider. A second input to the operational amplifier is derived from the battery terminal of the alternator through the test lead BA. Connection is through series resistors 66 and 68 which limit the current to the input terminal of the operational amplifier 64. A resistor 70 connects the input circuit to ground.

In operation, the operational amplifier 64 compares the DC voltage at the output of the alternator with the voltage derived at the junction of the resistors 60 and 62. If the voltage from the alternator is above a predetermined level, the output of the operational amplifier triggers on an SCR 72 by connecting the output of the operational amplifier 64 through a series resistor 74 to the gate electrode 76 of the SCR. The SCR 72 connects the indicator lamp 16 across one-half the secondary winding of the transformer 42. Thus with the SCR triggered on by the output of the operational amplifier 54, the indicator light 16 is turned on.

In addition to being controlled in response to the level of the DC component of the alternator output, the SCR 72 is also controlled in response to the AC component of the alternator output voltage. To this end, the BA test lead from the alternator is coupled through a large capacitor 78 bypassing the resistor 66 to a control circuit for operating a transistor switch 80 connecting the gate electrode 76 of the SCR to ground. The control circuit includes a series input capacitor 82, a shunting rectifying diode 84, a series coupling diode 86, a filter capacitor 88, and filter resistor 90 connected to the base of the switching transistor 80. If the AC component from the alternator output voltage is above a predetermined level, the transistor 80 is turned on, thereby clamping the gate electrode 76 to ground. This prevents the SCR from conducting irrespective of the level of the output of the operational amplifier 64. As a result, if any one of the six diodes forming the threephase full wave rectifier of the alternator output is open or short circuited, even though the no load DC voltage does not notably change, the AC component of the output voltage increases significantly, causing the switching diode 80 to prevent the SCR 72 from firing. Thus the indicator light 16 will remain off, signaling that the alternator under test is defective. If the diodes are alight but a stator winding is open or shorted, the DC output voltage of the alternator drops below the level at which the operational amplifier will fire the SCR.

What is claimed is:

1. A test device for testing an automobile three-phase alternator or the like independently of the automobile electrical system and without loading the alternator, the alternator having a ground terminal, a field terminal, and a battery terminal, the test device comprising:
    a DC voltage source adapted to be connected to the field terminal and the ground terminal of the alternator to energize the field winding of the alternator,
    a first circuit means adapted to be connected to the battery terminal and ground terminal of the alternator for producing a first DC signal having a magnitude that varies with the DC output voltage at the battery terminal of the alternator relative to ground,
    a second circuit means adapted to be connected to the battery terminal and the ground terminal of the alternator for producing a second DC signal having a magnitude that varies with the AC output voltage at the battery terminal relative to ground, and
    binary indicator means responsive to the magnitudes of the first and second signals for indicating when both the first signal is above a first predetermined magnitude and the second is simultaneously below a second predetermined magnitude.

2. Apparatus of claim 1 wherein the test device further includes means for driving the alternator.

3. Apparatus of claim 1 wherein the binary indicator means includes a light source, and means for turning on the light source when both the magnitude of the first signal exceeds said first predetermined magnitude and the magnitude of the second signal is below said second predetermined magnitude.

4. Apparatus of claim 3 wherein said means for turning on the light source includes a silicon controlled rectifier having a control electrode, and means responsive to said first and second signals coupled to the control electrode for turning on the silicon controlled rectifier.

5. Apparatus of claim 4 wherein said first circuit means includes an operational amplifier having two input terminals, a DC reference voltage being applied to one terminal, the voltage from the battery terminal of the alternator under test being connected to the other terminal, the output of the operational amplifier being connected to control electrode of the silicon controlled rectifier.

6. Apparatus of claim 5 wherein said second circuit means includes a diode rectifier, a capacitor for coupling the rectifier to the battery terminal of the alternator under test, whereby the output voltage of the rectifier is determined by the magnitude of the alternating current component of the alternator output, and a transistor connecting the control electrode of the silicon controlled rectifier and to the output of the rectifier for biasing off the silicon controlled rectifier in response to the output from said diode rectifier.

* * * * *